United States Patent
DeCusatis et al.

(10) Patent No.: US 8,396,952 B2
(45) Date of Patent: Mar. 12, 2013

(54) PROVISIONING AND COMMISSIONING A COMMUNICATIONS NETWORK WITH A VIRTUAL NETWORK OPERATIONS CENTER AND INTERFACE

(75) Inventors: Casimer M DeCusatis, Poughkeepsie, NY (US); Michael J Osias, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 12/539,908

(22) Filed: Aug. 12, 2009

(65) Prior Publication Data

US 2011/0040896 A1    Feb. 17, 2011

(51) Int. Cl.
G06F 15/173    (2006.01)

(52) U.S. Cl. .................. 709/223; 709/224

(58) Field of Classification Search .............. 709/223
See application file for complete search history.

(56) References Cited

U.S. PATENT DOCUMENTS

| | | | |
|---|---|---|---|
| 6,065,052 A | 5/2000 | Van Loo | |
| 6,401,136 B1 | 6/2002 | Britton et al. | |
| 6,519,060 B1 | 2/2003 | Liu | |
| 6,633,835 B1 | 10/2003 | Moran et al. | |
| 6,728,205 B1 | 4/2004 | Finn et al. | |
| 6,757,297 B1 | 6/2004 | Chin | |
| 6,775,229 B1 | 8/2004 | Mo et al. | |
| 7,002,968 B1 | 2/2006 | Tomizawa et al. | |
| 7,039,009 B2 | 5/2006 | Chaudhuri et al. | |
| 7,046,665 B1 | 5/2006 | Walrand et al. | |
| 7,124,368 B1 * | 10/2006 | Subramanian et al. | 715/736 |
| 7,151,773 B1 | 12/2006 | Mo et al. | |
| 7,231,148 B2 | 6/2007 | Kinoshita et al. | |
| 7,272,320 B2 | 9/2007 | DeCusatis et al. | |
| 7,724,407 B2 | 5/2010 | Cadet et al. | |
| 7,747,165 B2 | 6/2010 | Emery et al. | |
| 7,881,967 B1 | 2/2011 | Srinivasan et al. | |
| 2002/0064179 A1 | 5/2002 | Frank | |
| 2002/0129166 A1 * | 9/2002 | Baxter et al. | 709/246 |
| 2002/0165945 A1 | 11/2002 | Buswell et al. | |
| 2002/0191241 A1 | 12/2002 | Emery et al. | |
| 2003/0135596 A1 | 7/2003 | Moyer et al. | |
| 2003/0140128 A1 | 7/2003 | Cox et al. | |

(Continued)

OTHER PUBLICATIONS

Galan et al., "Control plane virtual extension for GMPLS-based optical networking testbeds," Proc. Workshop in MPLS/GMPLS networks, Apr. 2007.

(Continued)

Primary Examiner — David Lazaro
Assistant Examiner — Waseem Ashraf
(74) Attorney, Agent, or Firm — Karuna Ojanen; Ojanen Law Offices

(57) ABSTRACT

An interface coupled to a virtual network operations center and coupled to a data communications network having at least one optical channel. Equipment on the data communications network is identified by the interface wherein the interface coordinates and correlates communications between the I/O interfaces of a server coupled to the network so that data rates and data protocols are managed properly. The interface receives commands from and transmits commands to the data communications network and translates the commands to be further transmitted and used in the virtual network operations center coupled to the server. The data communications network is represented in a three dimensions virtual world in the virtual network operations center so that events on the network can be represented in real-time in the virtual network operations center.

14 Claims, 13 Drawing Sheets

U.S. PATENT DOCUMENTS

| | | | |
|---|---|---|---|
| 2003/0145069 A1 | 7/2003 | Lau et al. | |
| 2004/0004937 A1 | 1/2004 | Skalecki et al. | |
| 2004/0005151 A1 | 1/2004 | Pitchforth, Jr. | |
| 2004/0107277 A1* | 6/2004 | Levesque et al. | 709/223 |
| 2004/0114525 A1* | 6/2004 | Taylor et al. | 370/244 |
| 2005/0058064 A1 | 3/2005 | Phelps et al. | |
| 2005/0068960 A1* | 3/2005 | Green et al. | 370/395.2 |
| 2005/0089044 A1 | 4/2005 | Ciscon et al. | |
| 2005/0095008 A1 | 5/2005 | DeCusatis et al. | |
| 2005/0254438 A1 | 11/2005 | Turk et al. | |
| 2006/0013149 A1 | 1/2006 | Jahn et al. | |
| 2006/0104220 A1 | 5/2006 | Yamazaki et al. | |
| 2006/0165111 A1 | 7/2006 | Varma | |
| 2006/0171384 A1 | 8/2006 | Graves | |
| 2006/0182041 A1 | 8/2006 | Graves | |
| 2006/0187715 A1 | 8/2006 | Narvaez et al. | |
| 2006/0200856 A1 | 9/2006 | Salowey et al. | |
| 2006/0245755 A1 | 11/2006 | Gumaste et al. | |
| 2006/0248159 A1 | 11/2006 | Polan | |
| 2007/0094410 A1* | 4/2007 | Voigt et al. | 709/237 |
| 2007/0180436 A1 | 8/2007 | Travostino et al. | |
| 2007/0247395 A1 | 10/2007 | Barraclough et al. | |
| 2007/0282981 A1 | 12/2007 | Cohen et al. | |
| 2007/0286086 A1* | 12/2007 | Taylor et al. | 370/241 |
| 2008/0056159 A1 | 3/2008 | Suzuki et al. | |
| 2008/0059637 A1 | 3/2008 | Gerstel et al. | |
| 2008/0130517 A1 | 6/2008 | Lee et al. | |
| 2008/0159257 A1 | 7/2008 | Alfano et al. | |
| 2008/0175159 A1 | 7/2008 | Caveney et al. | |
| 2008/0181131 A1 | 7/2008 | Raghavan et al. | |
| 2008/0189353 A1 | 8/2008 | Gray et al. | |
| 2008/0209491 A1 | 8/2008 | Hasek | |
| 2008/0278478 A1 | 11/2008 | Dillenberger et al. | |
| 2008/0281912 A1 | 11/2008 | Dillenberger et al. | |
| 2008/0282004 A1 | 11/2008 | Dillenberger et al. | |
| 2008/0288220 A1 | 11/2008 | Dillenberger et al. | |
| 2008/0288505 A1 | 11/2008 | Dillenberger et al. | |
| 2009/0106817 A1 | 4/2009 | Omote et al. | |
| 2009/0263124 A1 | 10/2009 | Akyamac et al. | |
| 2009/0304381 A1 | 12/2009 | Muppidi et al. | |
| 2010/0005477 A1* | 1/2010 | Bovet et al. | 719/313 |
| 2010/0272435 A1 | 10/2010 | Pastorelli et al. | |
| 2010/0329269 A1* | 12/2010 | Selitser et al. | 370/401 |
| 2011/0038633 A1 | 2/2011 | De Cusatis et al. | |
| 2011/0038634 A1 | 2/2011 | De Cusatis et al. | |
| 2011/0040860 A1 | 2/2011 | De Cusatis et al. | |
| 2011/0040896 A1 | 2/2011 | De Cusatis et al. | |

OTHER PUBLICATIONS

Otani et al., "Interworking DWDM Equipment and PXC Operation using GMPLS for a Reliable Optical Network," Optical Fiber Communication Conference, vol. 2, Feb. 23-27, 2004 <http://www.ofcnfoec.org/materials/PDP03-1545.PDF>.

"Metro WDM Networking that Delivers Simplicity and Cost Savings to Metro Optical Networks," 7200 OSP Data Sheet, Meriton Networks, Inc., 2007, <http://www.meriton.com/products/documents/Meriton7200Datasheet1.2.pdf>.

Kuznetsov et al., "A Next-Generation Optical Regional Access Network," IEEE Communications Magazine, Jan. 2000, pp. 66-72.

Munroe et al., "The Choice for Today that won't Limit Tomorrow's Options," DiamondWave™, Calient Networks, presentation to OptiPuter, Oct. 25, 2002.

"Fiber and Equipment Protection," Solution Brief, JDS Uniphase, Known to applicant prior to Aug. 12, 2009, <http://www.agilitycom.com/other-literature/Brief_Fiber_Equip_Protection.pdf>.

* cited by examiner

PROVISIONING AND COMMISSIONING A COMMUNICATIONS NETWORK WITH A VIRTUAL NETWORK OPERATIONS CENTER AND INTERFACE

BACKGROUND

The present application relates to a method, machine and computer program product to provision, configure and manage a computer network, and more specifically, to provision, configure and manage a wavelength division multiplexed computer network using a virtual command interface.

A three-dimensional virtual environment providing near real-time, streaming visual representations for data center management has been disclosed in U.S. patent application Ser. No. 11/747,157 entitled VIRTUAL NETWORK WDM NETWORK 170 filed 10 May 2007, and U.S. patent application Ser. No. 11/747,147 filed on 10 May 2007 entitled HOLOGRAPHIC ENTERPRISE NETWORK, both of which are hereby incorporated by reference in their entirety and both have as a common assignee the assignee of this patent.

Hardware elements such as servers, racks, and power and cooling are structurally organized and visually represented in the virtual command center that displays platform(s) for equipment, observation decks and catwalks, display screens, and various infrastructures such as the in-world communications gear. The application of virtual command centers, however, has not been extended to wavelength division multiplexing networks within local area networks, metropolitan area networks, and wide area networks.

In fiber optic communications, wavelength division multiplexing (hereinafter WDM) is a technology which multiplexes multiple optical signals on a single optical fiber using different wavelengths of laser light to carry different signals. A wavelength division multiplexing system uses a multiplexer at the transmitter to join the different wavelength signals together and a demultiplexer at the receiver to split them apart. Because fiber optic communication channels share a common physical path, wavelength division multiplexing expands the capacity of a network without laying more optical fibers which in turn reduces the cost of leased optical fiber while enabling greater communication between remote data centers. In fact, an existing optical infrastructure of WDM and optical amplifiers is capable of accommodating several generations of technology development without having to change the backbone network. By simply upgrading the multiplexers and demultiplexers at each end, the capacity of a network link is expanded.

A WDM network is often employed in a metropolitan area network (MAN). WDM networking equipment has unique and difficult management challenges. First, WDM networking equipment does not automatically go onto the networks and discover the types of channels, e.g., Ethernet, Infiniband, Fibre Channel, PCI Express, Serial ATA, VoIP, connected on the network. Second, the WDM networking equipment must be manually provisioned and commissioned by a service technician prior to use. Moreover, whenever a channel type is modified, the WDM networking equipment must be manually provisioned and commissioned again. A WDM network requires networking equipment at each location; the locations, moreover, are typically quite far apart, so that at least two technicians are required to be at the different locations on the WDM network at the same time, communicating via cell phone or other means to coordinate settings on both ends of a link or a point-to-point connection on the WDM network. If the settings on both ends of the link are not the same, the link does not operate properly.

Most WDM networks use Transaction Language 1 (TL1) messages for management of the network resources. TL1 comprises a set of ASCII-based instructions or "messages" to manage a network element and its resources. Network element vendors use TL1 messages to implement embedded management interfaces for their network elements. TL1 is the dominant management protocol for controlling telecommunications networks in North America today and service providers have large TL1-based management operation support systems that control the network.

In any network system, it is critical to validate the proper configuration of the network equipment and enforce configuration constraints required by the servers. As mentioned, provisioning an existing network to have a new channel or a new element requires a human being to go to the equipment and manually configure and provision it. Examples of configuration constraints are that a FICON (Fiber Connectivity) channel should not be connected to a network interface that doesn't support the FICON data rate; another is that two FICON channels that are supposed to be redundant actually should be provisioned across two physically redundant WDM paths. Improper configuration of a WDM client interface to a server can result in a failed link and/or significantly more bit errors to which the server will respond by retransmitting numerous requests consuming the server's resources. Unless a redundant or high availability configuration is validated the system administrator could mistakenly think that the network is fault tolerant. In order to correct a problem that arises, moreover, the administrator may attempt to vary a path offline for maintenance, not realizing she/he is disrupting all connectivity to the remote location. It is thus important to validate the configuration of a WDM network.

Once configured, among the unique and most important requirements of a WDM network interface is protection switching. The WDM equipment offers protection switching that splits traffic across two physically redundant paths, and when one path is detected as being interrupted, the WDM equipment automatically switches data to the redundant or backup path. Protection switching may be implemented as a unidirectional path switched ring or a bidirectional line switched ring, provisioned within the network equipment. The faillover switch usually occurs within 50-100 milliseconds or longer.

Sometimes it becomes necessary to provision a link offline for maintenance, such as repair of a degraded optical fiber connection. To date, this reprovisioning is achieved manually. Thus, dynamic switching, such as switching from a longer path to a shorter path to reduce latency between the attached servers is necessary. Such dynamic switching will improve performance and/or reduce the need for buffer credit flow control under some protocols such as FICON or Fibre Channel.

Protection switching as above is required for disaster recovery and other synchronous applications, but these applications have additional requirements. Timing information of failures or protection switches and other events are not coordinated on the WDM network until equipment logs are taken after the fact and reviewed manually.

The Open Systems Interconnection Reference Model (OSI Reference Model or OSI Model) is an abstract description for layered communications and computer network protocol design that, in its most basic form, divides network architecture into seven layers which, from top to bottom, are the Application, Presentation, Session, Transport, Network, Data-Link, and Physical Layers. There are quality of service monitoring mechanisms for Internet traffic that are supposed to prevent network congestion or delays time through monitoring at various OSI levels but they only monitor internet protocols within a server; these mechanisms do not enable communication between a server and network element. There are, moreover, network management systems that control optical switches using a supervisory communication channel but the switches do not connect the network management system to any other management system, such as another server. Consequently, an attached server is not aware of switching operations within the network. These switches, moreover do not process TL1 commands, correlate events on the server and network, or translate commands between a server and networking equipment.

There is also a fully transparent network switch that reports its status to the network management interface but it is independent of any attached server equipment. While both the switch and network management interface support TL1 protocol and other management interfaces, they do not connect to subtended equipment so that servers connected to the WDM are unaware of switch events in the network. Network elements such as routers, switches, and hubs are capable of providing Simple Network Management Protocol (SNMP) messages for conditions that warrant administrative attention, such as checking of the IP network configuration and IP protocols, but these equipment do not collect information from servers attached to the network or correlate/validate the servers' requirements with the network configuration. These network elements, moreover, do not perform in multiprotocol data center environments.

A virtualized control plane used in a high speed optical network testbed has a configurator tool with a graphical user interface (GUI) interface used to configure network parameters across multiple network elements. These network elements support GMPLS, a wide area networking protocol for wavelength routing. The tool, however, does not collect information from servers attached to the network; nor can it validate server requirements because server platforms do not support GMPLS. A wavelength multiplexer can be provisioned for data protection, performance monitoring, and other features using an SNMP interface option but these existing multiplexers also do not collect or correlate corresponding information from servers attached to the network. An optical provisioning layer in a WDM network currently used to reconfigure the topology and reprovision services in networking equipment has no capability to collect or correlate the corresponding information from servers attached to the network. Currently, bandwidth provisioning on a WDM cannot be accomplished through direct communication between the server and network interfaces. Identification of the number and type of channels required by the server are not done on existing WDMs.

At present, timing of add/drop or other events within a WDM network is not correlated with other events in the servers or other equipment connected on the network. A clock source within the WDM network (compatible with SONET standards) may generate a synchronous clocking signal to retime and regenerate signals after long distances but these signals do not signify or communicate events to any servers attached to the network. Quality of service software that can convert traffic into and schedule IP data packets also does not interface with the attached servers. The timing of network protection switch events using a typical WDM optical switch cannot be controlled by servers transmitting data over the network.

Transmit data queues and receiver queues are used to associate an identity with a given packet of data but they do not correlate the timing of network events with those on a server attached to the network. Tracking a sequence of packets as they transit through a network node as in, for example, logging the time when a given packet passes a given node, is performed relative to a reference clock within the network, but again that time is not correlated with any external server clocks thereby making it impossible to associate transit times within the network and events on attached servers.

Servers on a WDM network transmit and receive TL1 commands but to date, there is no TL1 command translation or encapsulation within a virtual network management interface. TL1 commands are not translated into a format compatible with existing computer management interfaces, or converted to other formats. There is no coordinated management between the server and WDM equipment, particularly for WDM equipment which may be located very far away from the server, e.g., 100 kilometers or more. To date, the network does not respond to changes in network resources or changing conditions on an attached server.

There exists a further need to correlate network events with server processing and messaging.

SUMMARY

Disclosed herein is a computer comprising: a virtual network operations center; an interface operationally connected to the virtual network operations center; at least one input/output (I/O) port on the interface operable to receive and transmit messages to at least one data communications network having at least one optical channel; a tag association component that correlates identifiers of a plurality of equipment connected on the data communications network with one or more data channels of the computer; and a connection component that encapsulates the messages for transmission to the virtual network operations center; whereby the data communications network is represented as a three-dimensional virtual world in the virtual network operations center. The data communications network may be a wavelength division multiplexed network, and the interface would be able to receive and transmit data on the wavelength division multiplexed network. The interface can also receive and transmit electrical analog or digital data.

The messages may be encapsulated using XML remote procedure calls encoded with the holographic protocol architecture protocol. The messages transmitted to and from the data communications network may be TL1 messages, and the computer may further comprise a plug in framework component that modifies one or more interfaces of the one or more input/output (I/O) ports to understand and generate TL1 messages.

Also disclosed herein is an embodiment of a method to provision and commission a data communications network having at least one optical channel, the method having the steps of: extracting network information about the network configuration and identifiers of equipment on the network, the interface being operationally connected to the data communications network; receiving server information about a server's I/O configuration, the interface being operationally connected to the server; assigning server identifiers to one or more I/O adapters of the server's I/O configuration; modifying one or more of the I/O adapters of the server's I/O configuration to read and write messages on the data communications network; associating the server identifiers with the network configuration and the one or more identifiers of the equipment on the network; provisioning the data communications network so that equipment on the network will receive and transmit data in a protocol and data rate compatible with the one or more I/O adapters of the server; and rendering the network configuration in a virtual network operations center on the server, the virtual network operations center operationally connected to the interface.

The method may further generate correlation tags between the equipment on the data communications network provisioned to receive data from the I/O adapters of the server.

The data communications network may have a plurality of optical channels, one or more of which may be connected to a wavelength division multiplexed network.

The method may further extract network information which may comprise one or more of the following: data protocols and data rates of data transmitted on the data communications network; the topology of the data communications and connection information of the equipment on the network, protection switching capabilities of the data communications network; one or more regeneration commands for the equipment on the data communications network.

Also revealed herein is a computer program product for provisioning and commissioning a data communications network operatively coupled to a server, the computer program product having a computer readable storage medium having computer readable program code embodied therewith, the computer readable program code comprising: a network extraction component to extract network configuration information of a data communications network; a server extraction component to extract information of a server's I/O configuration, the server being operationally coupled to the data communications network; an identifier component that assigns identifiers to one or more I/O adapters of the server's I/O configuration and extracts identifiers of each equipment of the data communications network; a tag association component that stores the identifiers of the one or more I/O adapters of the server and the one or more identifiers of the equipment on the data communications network; a tag correlation component to correlate the identifiers of the one or more I/O adapters of the server with the one or more identifiers of the equipment on the data communications network that receives and transmits data from and to its respective one or more I/O adapters; a commissioning component to control data communications on the data communications network so that equipment on the data communications network will receive and transmit data in a protocol and data rate and on a channel compatible with other equipment on the data communications network; and a communications component to transmit the network configuration to a virtual network operations center operationally coupled to the server.

The computer program product may also have a plug-in framework component comprising one or more plug-ins for the one or more I/O adapters of the server's I/O configuration to translate the I/O adapter's protocol to a protocol for transmission on the data communications network. There may also be a TL1 component to read and write TL1 commands from and to the data communications network within the computer program product; as well as a network event component to provide protection switching and regeneration commands when an event occurs on the data communications network.

Further described herein is a service to couple a wavelength division multiplexed network to at least one server, the service comprising installing at least one interface on the server to couple with the wavelength division multiplexed network; installing a virtual network operating center on the server; coupling the at least one interface with the virtual network operating center; coupling the at least one interface to receive and transmit TL1 messages on the wavelength division multiplexed network; modifying one or more I/O interfaces of the server to receive and transmit TL1 messages; and encapsulating the TL1 messages to send to the virtual network operating center.

A service to provision and commission a wavelength division multiplexed network is also offered, the provisioning and commissioning service comprising: acquiring configuration information of all elements coupled to the wavelength division multiplexed; acquiring configuration information of at least one I/O interface of a server coupled to the wavelength division multiplexed network; modifying the at least one I/O interface of the server to receive and transmit commands understandable by the all elements of the wavelength division multiplexed network; determining which elements of the wavelength division multiplexed network should receive and transmit data of the same protocol and data rate; determining which pathways of the wavelength division multiplexed network are redundant; determining alternative pathways of the wavelength division multiplexed network; determining protection switching for the wavelength division multiplexed network; determining whether and the type of regeneration commands for the elements of the wavelength division multiplexed network; and representing the wavelength division multiplexed network in a virtual network operating center coupled to the interface and to the server.

BRIEF DESCRIPTION OF THE DRAWINGS

FIG. 7 is a simplified flow chart of the process steps implemented by the various components shown by which the WDM network configuration can be validated in accordance with embodiments described herein.

FIG. 8 is a representation of how a TL1 command is encapsulated within the HEI for transmission to and understanding by the VNOC in accordance with an embodiment described herein.

DETAILED DESCRIPTION OF THE INVENTION

Figure 1:
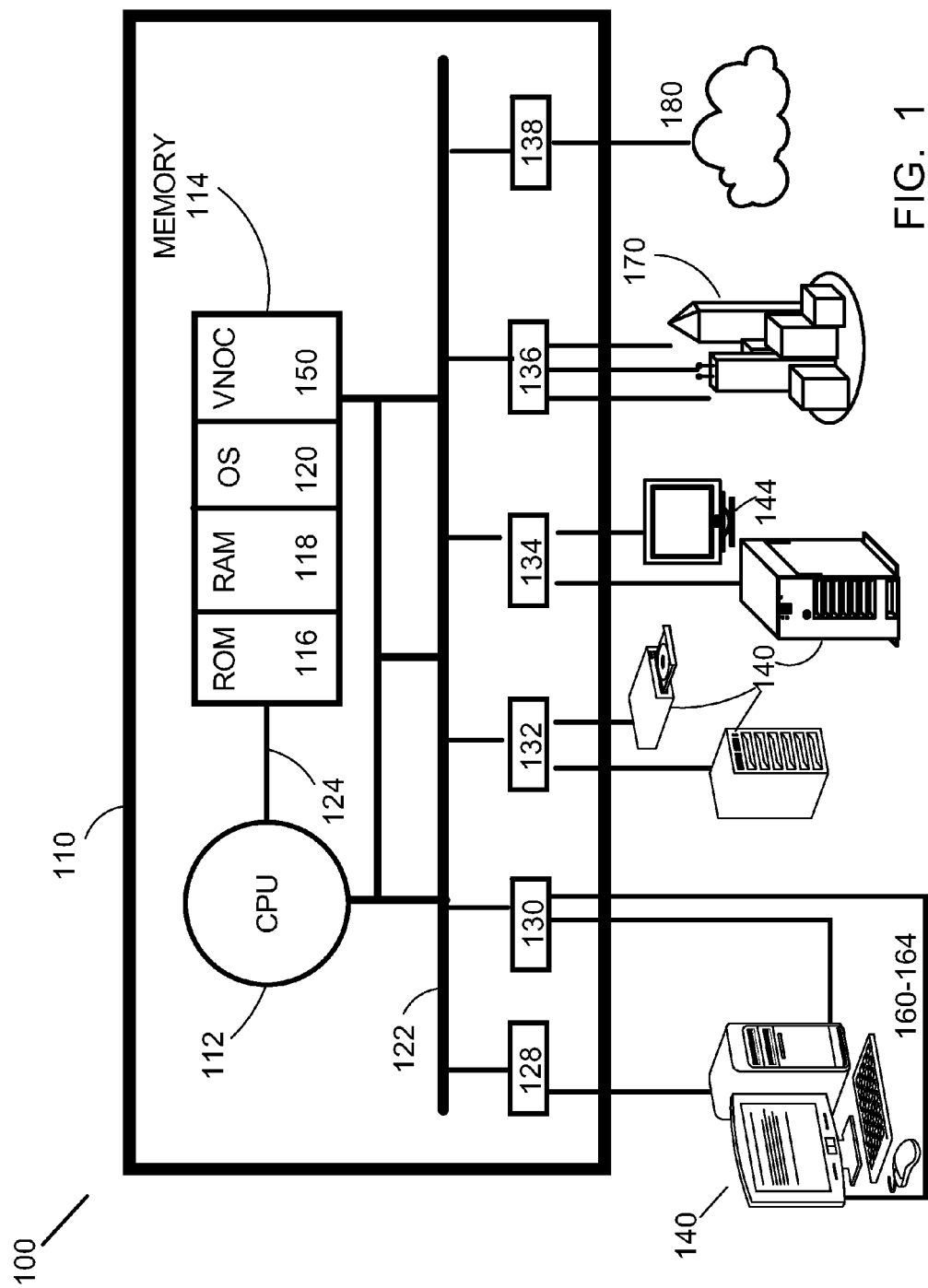
FIG. 1 is a high-level block diagram of a computer network system consistent with an embodiment of a server connected on a wavelength division multiplexed network.

Referring to FIG. 1, shown is a high-level block diagram of a computer network system 100 having a server 110 connected on a wavelength division multiplexed network 170. Computer network system 100 preferably comprises a number of secure networked servers 110, each of which may have one or more central processing units (CPU) 112, memory 114, and various digital, analog, and/or optical interfaces 128-138. CPU 112, memory 114, interfaces 128-138 and various other internal devices capable that communicate with each other via an internal communications bus arrangement 122. CPU 112 is a general-purpose programmable processor executing computer program instructions stored in memory 114. A single CPU 112 is shown in FIG. 1 but it should be understood that some servers 110 have multiple CPUs in an arrangement called a sysplex. CPUs 112 are capable of executing an operating system 120 and various applications. CPUs 112 are also capable of generating, receiving and transmitting the computer program components embodying the VNOC 150 and HEI 136 components that manage the WDM network 170. Communications bus 122 supports transfer of data, commands and other information between different devices and interfaces; and while shown in simplified form as a single bus, it is typically structured as multiple buses including an internal bus 124 which may connect the CPUs 112 directly with memory 114.

Memory 114 is shown conceptually as a single monolithic entity but it is well known that memory is often arranged in a hierarchy of caches and other memory devices, some or all of which may be integrated into the same semiconductor substrates as the CPUs 112. Memory 114 comprises a read only memory (ROM) 116 that typically stores those portions or programs, routines, modules of the operating system 120 necessary to "boot up" the system. Random-access memory (RAM) 118 devices comprise the main storage of computer as well as any supplemental levels of memory, e.g., cache memories, nonvolatile or backup memories, programmable or flash memories, other read-only memories, etc. RAM 118 is also considered the volatile memory storing programs and data that are executing as well as the operating system 120, a VNOC 150, a HEI 136, and other applications, data and programs such as graphical user interfaces, application program interfaces by which the VNOC 150 and the HEI 136 can monitor the WDM network 170. In addition, memory 114 may be considered to include memory storage physically located elsewhere in server 110, e.g., a cache memory in another processor or other storage capacity used as a virtual memory such as on a mass storage device or on another server 110 coupled to server 110 via a network. It is fully realizable that the VNOC 150 and the modified HEI 136 can be used to detect and interpret events on the WDM 170 and other servers 110 also connected on the WDM 170 in accordance with the teachings herein.

Operating system 120 provides, inter alia, functions such as device interfaces, management of memory pages, management of multiple tasks, etc. as is known in the art. Examples of such operating systems may include Linux, Aix, Unix, Windows-based, Z/os, V/os, OS/400, an Rtos, a handheld operating system, etc. In one embodiment described herein, the operating system is z/OS for IBM'S zSeries servers. Operating system 120 and other variants of the VNOC 150 and the modified HEI 136, and other applications, other components, programs, objects, modules, etc. may also execute on one or more servers 110 coupled to server 110 via a network 170, 180, e.g., in a distributed or client-server computing environment, whereby the processing required to implement the functions of a computer program may be allocated to multiple computers 110 over a network 170, 180.

In general, software components of the VNOC 150 and the modified HEI 136 execute within the CPUs 112 to implement the embodiments described herein, whether implemented as part of an operating system or a specific application, component, program, object, module or sequence of instructions may be referred to herein as computer programs or simply components. The VNOC 150 and the modified HEI 136 typically comprise one or more instructions that are resident at various times in various memory 114 and storage in a device and that, when read and executed by one or more CPUs 112 in the server 110, cause that server 110 to perform the steps necessary to execute steps or elements embodying the various aspects of the methods and processes described herein.

It should be appreciated that server 110 typically includes suitable analog, digital and optical interfaces 128-138 between CPUs 112, memory 114 and the attached devices. For instance, server 110 typically receives a number of inputs and outputs for communicating information externally. For interface with a human database administrator or user, server 110 typically includes one or more software developer input devices 162-164, e.g., a keyboard, a mouse, a trackball, a joystick, a touchpad, and/or a microphone, among others, and a visual display monitor or panel, and/or a speaker, telephone, among others. It should be appreciated, however, that some implementations of server 110 do not support direct software developer input and output. Terminal interface 134 may support the attachment of single or multiple terminals 144 or laptop computers 144 and may be implemented as one or multiple electronic circuit cards or other units. Data storage preferably comprises a storage server functionally connected to one or more rotating magnetic hard disk drive units, although other types of data storage, including a tape or optical driver, could be used. For additional storage, memory 114 of server 110 may also include one or more mass storage devices such as a floppy or other removable disk drive, a hard disk drive, a direct access storage device (DASD), an optical drive e.g., a compact disk (CD) drive, a digital video disk (DVD) drive, etc., and/or a tape drive, a flash memory, among others. Other memories may be located on storage, including RAMs or mass storage devices of different servers 110 connected through various networks. In the context herein memory 114 may also be considered nonvolatile or backup memories or a programmable or flash memories, read-only memories, etc., in a device physically located on a different computer, client, server, or other hardware memory device, such as a mass storage device or on another computer coupled to computer via network. Memory 114 may comprise remote archival memory such as one or more rotating magnetic hard disk drive units, a tape or optical driver. One of skill in the art will further anticipate that one or more interfaces 128-138 may be wireless.

Furthermore, server 110 includes an interface 136, 138 with one or more networks 170, 180 to permit the communication of information with other servers coupled to the network(s) 170, 180. Network interface(s) 136, 138 provides a physical and/or wireless connection for transmission of data to and from a network(s) 170, 180. Network(s) 170, 180 may be the Internet, as well as any smaller self-contained network such as an Intranet, a virtual private network (VPN), a wide area network (WAN), a local area network (LAN), or other internal or external network using, e.g., telephone transmissions lines, satellites, fiber optics, T1 lines, wireless, public cable, etc. and any various available technologies. Communication with computer system 100 may be provided further via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

As described herein, a wavelength division multiplexed network 170 is connected through a HEI 136 and a VNOC 150 implemented on server 110. One of ordinary skill in the art understands that server 110 may be connected to more than one network 170, 180 simultaneously. Server 110 and remote servers 110 may be desktop or personal computers, workstations, a minicomputer, a midrange computer, a mainframe computer. Any number of servers, clients, computers and other microprocessor devices, such as personal handheld computers, personal digital assistants, wireless telephones, etc., which may not necessarily have full information handling capacity as the large mainframe servers, may also be networked through network(s) 170, 180. Still yet, any of the components of the methods and program products shown in the embodiments of FIG. 1 through FIG. 13 could be deployed, managed, serviced by a service provider who prioritizes searches to a databases based on search template attributes.

As will be appreciated by one skilled in the art, one or more of the embodiments described herein may be embodied as a system, method or computer program product. Accordingly, the present invention may take the form of an entirely hardware embodiment, an entirely software embodiment (including components, firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network or the connection may be made to an external computer by, for example, through the Internet using an Internet Service Provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
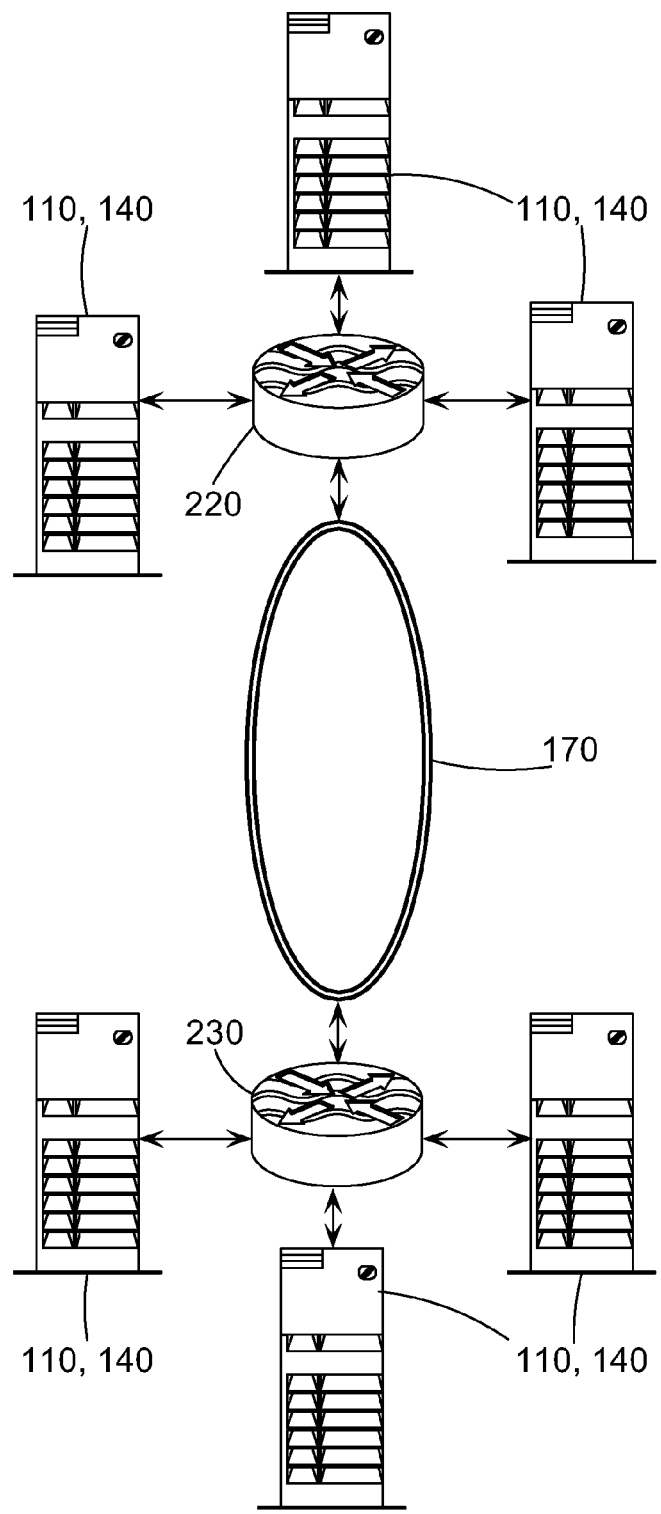
FIG. 2 is a simplified representation of a WDM network.

FIG. 2 is a simplified block diagram of a basic WDM network 170. Servers and/or clients 110, 140 are connected to a WDM channel extension 220. WDM channel extension 220 (also called a WDM box) in turn is connected to an optical network 170, such as a dual redundant optical network. The WDM network 170 is then connected to one or more other WDM channel extensions or boxes 230 which are connected to other servers and/or storage 110, 140.

Figure 3:
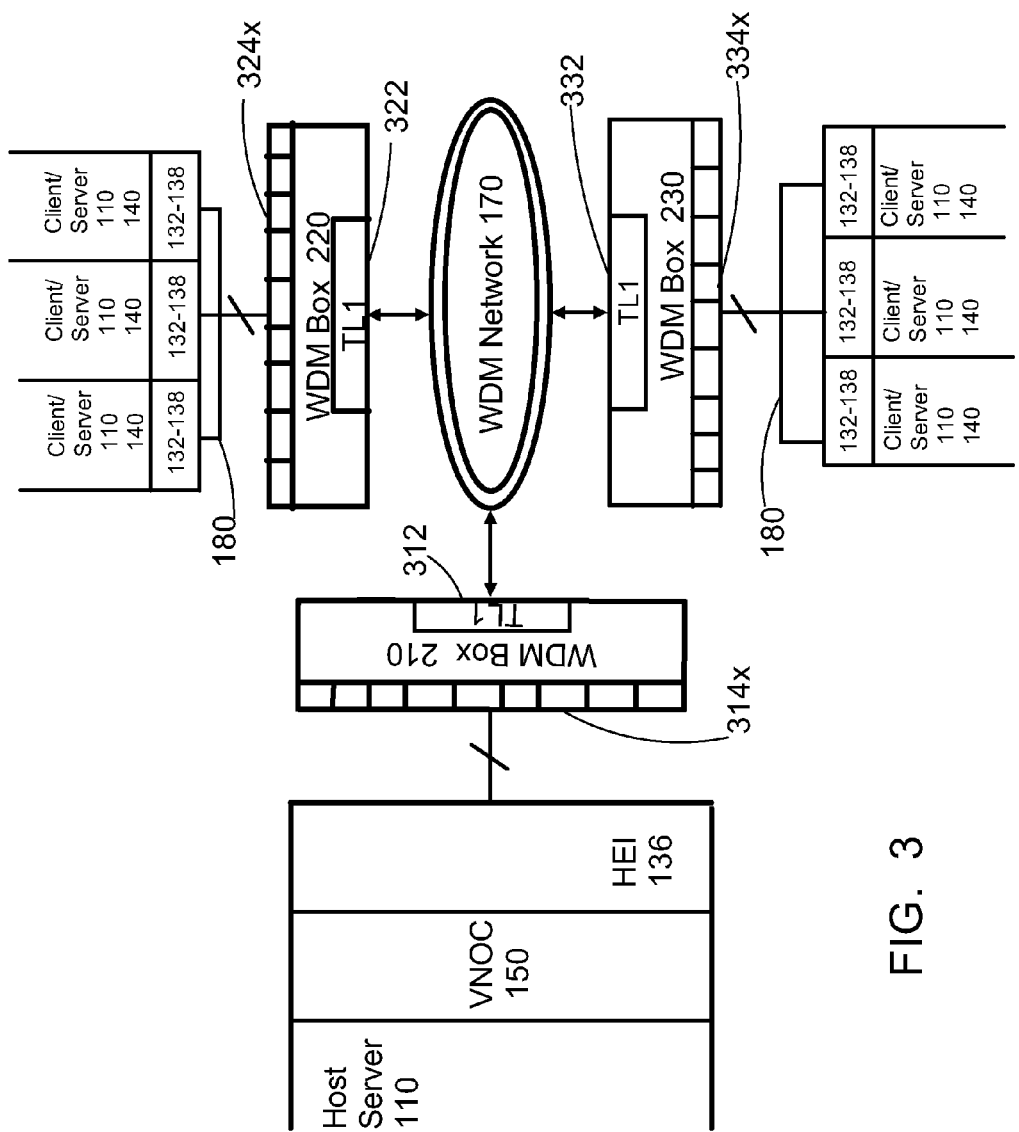
FIG. 3 is a more detailed block diagram of the various hardware and software components connected on a WDM network in accordance with various embodiments described herein. It is suggested that FIG. 3 be printed on the face of the patent.

FIG. 3 provides more detail of the basic WDM network 170 which can be used in accordance with the embodiments described herein. A plurality of servers 110 and clients 140 are shown having interfaces 132-138 connected on a WDM network 170 to transmit and receive messages and data in different protocols on different channels to various clients, servers, or other network equipment. Each WDM channel extension 210, 220, 230 has a number of channels/ports 314$x$, 324$x$, 334$x$ to receive and transmit these messages and data in the various protocols and channels. WDM channel extensions 210, 220, 230 such as those provided by CISCO, NORTEL and other vendors are known in the art. Each WDM channel extension 210, 220, 230 may have a respective TL1 interface 312, 322, 332 connected to a WDM network 170 to transmit and receive TL1 messages. The WDM network 170 is connected through the HEI 136 to a VNOC 150 executing on a server 110.

Figure 13:
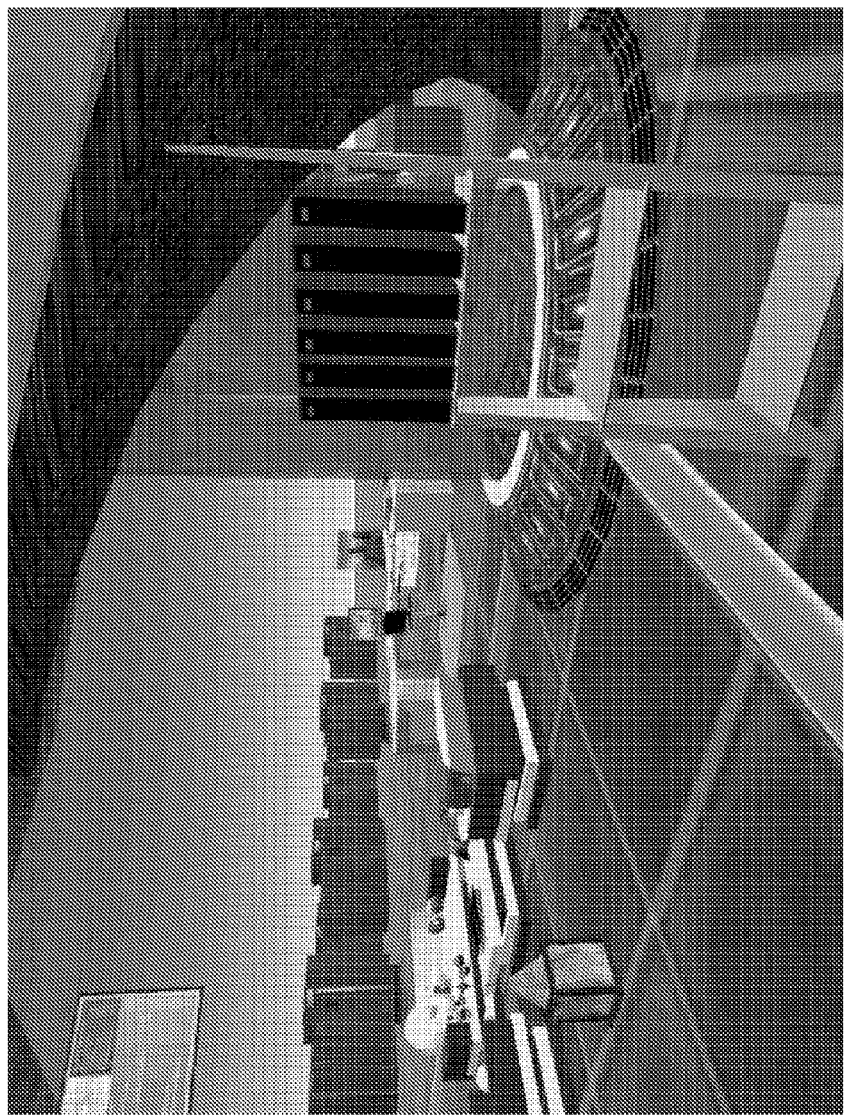
FIG. 13 is a representation of how a WDM network can be represented in a virtual command center in accordance with embodiments described herein.

The VNOC 150 is a software and hardware component installed on a server 110 that provides a virtual world of the WDM network 170 and represents the equipment, the channels, the protocols, the servers, etc. on the WDM network 170; see FIG. 13 for how the network can be displayed as a result of the VNOC. The VNOC 150 also provides one or more computer generated icons or avatars to travel through this three-dimensional representation of the WDM network 170 to configure, provision, reroute signals, perform maintenance, protection switching, etc. on the WDM network. The VNOC 150 is a platform which allows a single common view of hardware and the WDM equipment that are typically geographically distributed among multiple locations. The hardware is depicted as three-dimensional graphical icons in a virtual environment where these icons are interactive and manipulible by avatars within the virtual world. The VNOC 150 enables the WDM network to be monitored, managed, reconfigured and maintained proactively in real time. One VNOC 150 that can be implemented when modified with the embodiments described herein is described in U.S. patent application Ser. No. 11/747,157 entitled VIRTUAL NETWORK WDM NETWORK 170 filed 10 May 2007, which is hereby incorporated by reference in its entirety and has a common assignee as this patent.

Figure 4:
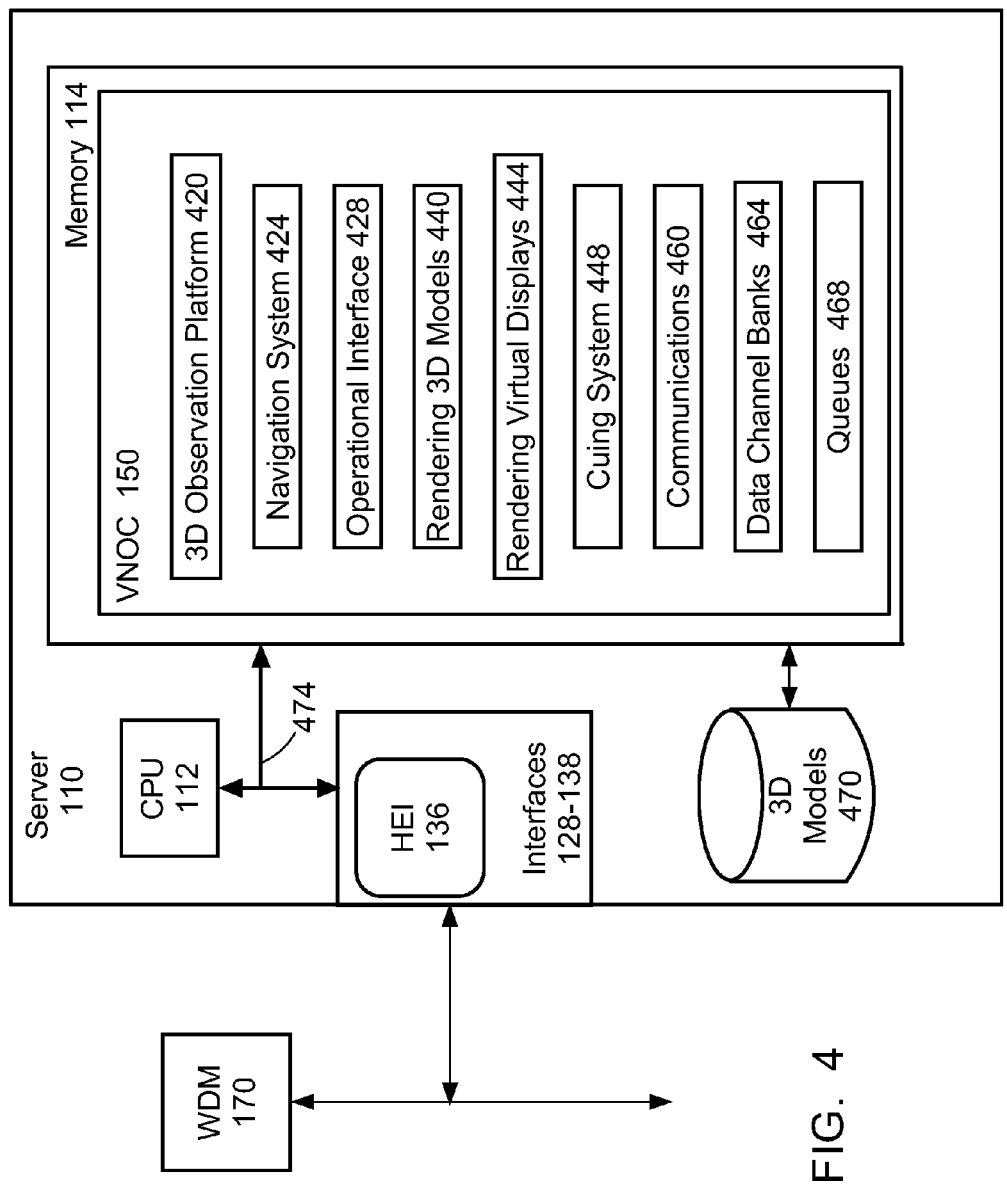
FIG. 4 is a simplified block diagram of components implementing an embodiment of the VNOC in the server.

Components of VNOC 150 are shown in FIG. 4. In the embodiments described herein, server 110 is executing the software components generating the VNOC 150. Although the VNOC 150 is shown as implemented in only one server 110 connected on the network 170, any server 110 or client 140 may also have a VNOC 150. VNOC 150 is generated in a simulated three dimensional observation space such as a 256×256×768 three-dimensional vector space. The observation space provides a virtual universe in which one or more operators can engage and interact as avatars or bots, for example, within the VNOC 150 to view and manipulate virtual components that mirror actual components and operations on the network 170 and in the server 110, such as shown in FIG. 13. VNOC 150 includes a system for generating an observation platform 420 from which the VNOC 150 can be viewed, a navigation system 424 for navigating throughout the VNOC 150, an operational interface system 428 for interfacing with server 110 and HEI 136 to effectuate actual changes in the WDM network 170, a system for rendering three dimensional models 440 (also referred to herein as rezzers) from three-dimensional models database 470, a system for rendering virtual displays 444, a cuing system 448, a communications hub 460, and a virtual enterprise, i.e., holographic bus 474. VNOC 150 may further include data channel banks 464 for receiving and sending data such as XML-RPC, email, and other channels to/from a two-dimensional infrastructure, and queues 468. Data channel banks 464 allow for parallel messaging while queues 468 facilitate asynchronous communications. These components interact to generate and maintain a mirror image of the WDM network 170 and to provide spatial, visual, and audio cues that alert and inform operators of conditions and events on the WDM network 170. An actual control center (not shown) of the WDM network 170 may execute on server 110 and may comprise any type of enterprise management environment, e.g., a data center, a utility service providers, military command and control systems, etc. Data between the server 110 and the WDM network 170 can be passed back and forth in near real-time such that actual operational information can be viewed in the three-dimensional virtual simulator system 420 of the VNOC 150. Operations affecting the WDM network 170 are implemented via the operational interface 428 of the VNOC 150.

In the illustrative examples described herein, VNOC 150 is generated and automatically rendered as a holographic observation space. The state of VNOC 150 is maintained with data from an actual WDM network 170. As noted, VNOC 150 represents both the spatial and operational configuration of the real WDM network 170. Thus, an operator may navigate VNOC 150 as if they were inside the actual WDM network 170 and/or on the actual WDM network 170.

Three dimensional models 440 includes representations of any hardware or software component found in the WDM network 170 including systems, processes, devices, programs, equipment, servers, HVAC, floor plans, etc. The component, i.e., rezzers, for rendering three-dimensional models 440, moreover, can be configured to display expanded or layered views of the internals of any other component on the WDM network 170. For example, clicking on a server 110 or a client 140 connected to the network 170 may show visual cues of the server's/client's CPU, hard disk, and logical partitions. Further clicking on any of these components shows or expands the next level of detail. Middleware architecture can also be rendered in three-dimensional in the VNOC 150 to show a three-dimensional representation of operating systems, application servers, databases, web services, transaction flows, and ultimately virtual business processes. The hardware and software renderings may be layered in three-dimensional on a rendered platform and appear as a virtual stack with the systems on the bottom and business processes on the top.

Cueing system 448 provides a mechanism for cuing an operator of some relevant information associated with a modeled component. In particular, cuing system 448 presents visual and audio cues to alert operators of conditions and events in the WDM network 170. These cues may comprise alerts that change color of a component, highlight a component with a three-dimensional arrow, sound an alert message, set off various beacons, etc. Cues may occur in response to hardware faults, middleware or operating system configuration issues, business process performance issues, etc.

Communications hub 460 manages communications between VNOC 150 and server 110, the HEI 136 and the WDM network 170. Such communications can be local such as from the server 110 or remote from the WDM network 170 or other connected network. The communications hub 460 dispatches and routes messages from all channels to the holographic bus 474. The holographic bus 474 then delivers messages to the appropriate rendering infrastructure. In this illustrative embodiment, the HEI 136 encapsulates data from the WDM network 170 into packets using XML-RPC (remote procedure calls) encoded with the Holographic Protocol Architecture (HPA). HPA is a predefined protocol utilized by a scalable interface, e.g., implemented as a two-dimensional JAVA server that processes information associated with operations of the WDM network 170 which are ultimately rendered in three-dimensional by VNOC 150. Communications hub 460 also receives and transmits other communications, such as email, between VNOC 150 and HEI 136. Communications hub 460 receives messages from the HEI 136 which decodes the packets. These packets are then used by the VNOC 150 for rendering three-dimensional models by virtual displays and by cues within the VNOC 150. The communications hub 460 also manages outgoing communications and a queuing system to dispatch packets to the HEI 136.

Communications with the VNOC 150 are based on interobject messages using communications channels and email. For example, the rezzers receive communications about which types of equipment, middleware, and process objects to model, and the virtual displays receive information of interest about the operations being managed. Operators are able to perform all management functions, such as provisioning a logical partition on a distant server connected on the WDM network 170, a cluster, or an entire grid, as well as install and configure operating systems and middleware on the WDM network 170 by interacting with the three-dimensional models.

The holographic enterprise interface (HEI) 136 provides the middleware between the VNOC 150 and the WDM network 170; in other words, the HEI 136 is the bridge from the actual reality of the WDM network 170 to the virtual reality created and displayed by the VNOC 150. The physical connection between the HEI 136 and WDM network equipment 210 may be a serial or parallel copper wiring cable connection, such as an Ethernet connection or similar broadband connection. Modified as described herein, one HEI 136 that can be used within the embodiments described herein is set forth in U.S. patent application Ser. No. 11/747,147 filed on 10 May 2007 entitled HOLOGRAPHIC ENTERPRISE NETWORK, which is hereby incorporated by reference in its entirety and has a common assignee as this patent.

Figure 5:
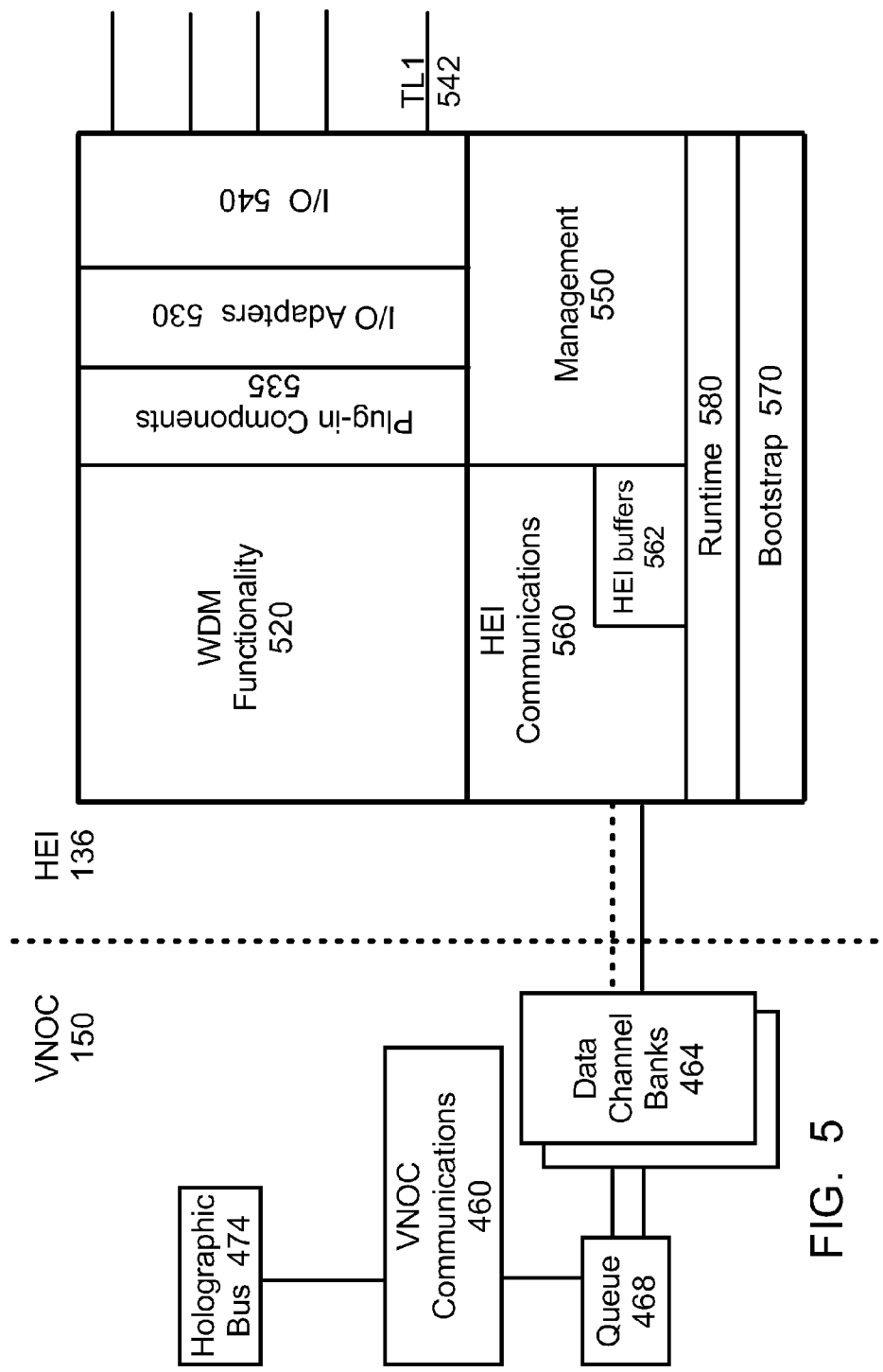
FIG. 5 is a simplified block diagram of components used in the HEI to implement the processes in accordance with the embodiments described herein.
Figure 6:
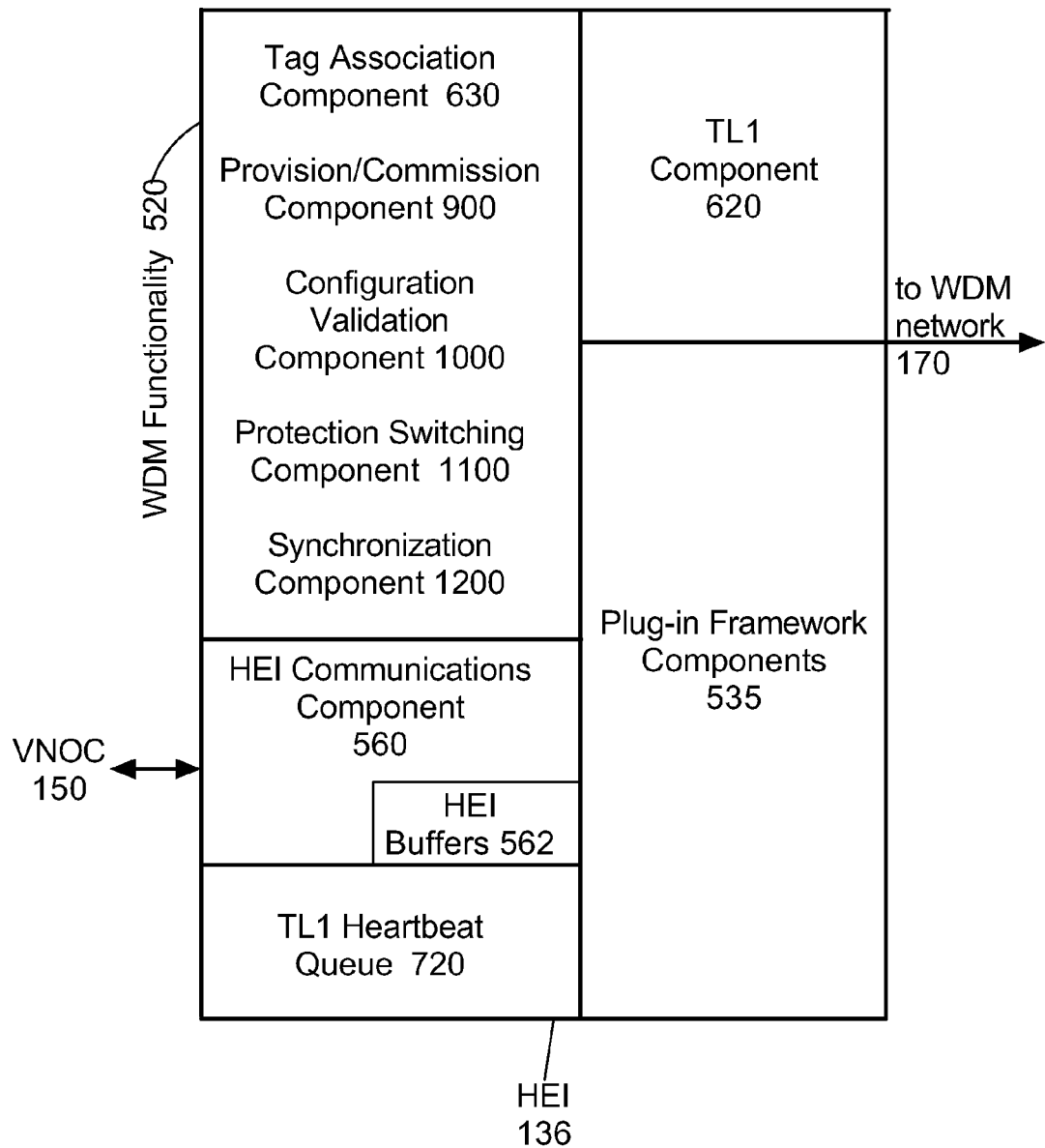
FIG. 6 is a simplified block diagram of other components used in the HEI to implement the processes for a WDM in accordance with the embodiments described herein.

Components of the HEI are shown in FIGS. 5 and 6. FIG. 5 is a simplified block diagram of the HEI 136 and connecting infrastructure. HEI 136 comprises a WDM functional component 510, a plurality of I/O adapters 530 modified with a plug-in framework 535, a plurality of I/O connections 540, a management component 550, a communications component 560, a bootstrap component 570 and a runtime component 580. The WDM functional component 510 encompasses several subcomponents that translate data from the WDM network 170 and other connections 540 into a format recognizable and usable by the VNOC 150. The I/O connections 540 include fiber optics and electrical analog and digital connections, such as Ethernet, T1, etc. Data communication over these I/O connections 540 from the WDM network 170 must be translated into a format understandable and usable by VNOC 150. The I/O adapters 530 are modified by plug-in framework components 535 to allow translation of the various formats associated with the I/O adapters 530 into a format understandable and usable by the VNOC 150. Similarly, data from the actual control center on the server 110 must be translated for the component on the WDM network 170 to respond. The bootstrap component 570 allows a cold boot-up of the HEI 136. The runtime component 580 provides one or more virtual machines of, e.g., JAVA, LINUX, zVM, etc. The management component 550 manages communications including events, scheduling, database operations, logging, management and kernel operations.

To accomplish the bridging of data transmission between the virtual world of the VNOC 150 and the actual world of the WDM network 170, the HEI 136 is modified with additional components as shown in FIG. 6. The WDM functionality component 520 has a TL1 component 620 and a tag association component 630. The TL1 component 620 comprises a TL1 interface 542 for transmission and receipt of TL1 commands. The tag association component 630 generates and stores TL1 IDs and correlation tags for network equipment on the WDM network 170. The tag association component 630 also associates the UUIDs of the ports in the server with the TL1 correlation tags of the WDM equipment on the WDM network 170; this enables operations such as provisioning the network equipment. The WDM functionality component 520 further has other components associated with processes and functions described with respect to the flow charts; these include a provisioning/commissioning component 900, a configuration validation component 1000, a protection switching component 1100, and a synchronization component 1200, as will be explained herein.

The plug-in framework components 535 modify the I/O adapters 530 of different data protocols transmitted on the WDM network 170 and other connected networks. In order for data in these protocols to be represented in the VNOC 150, the HEI 136 provides the plug-in framework components 535 as application program interfaces that translate between two dimensional data and three-dimensional data. The plug-in framework components 535 allow communication with the WDM network 170 to provision and commission third party networking equipment, such as WDM channel extensions 210, 220, 230.

HEI communication component 560 allows bidirectional communications with the server 110 and the VNOC 150. The HEI communications component 560 cooperates with the tag association component 630 and encapsulates the TL1 commands for transmission in holographic protocol architecture (HPA) format to the VNOC 150. The HEI communications component 560 also receives HPA protocol messages from the VNOC 150 and simulates connections to the WDM network 170 and different protocols used by the server 110. HEI communication component 560 implements HPA and XML-RPC. XML-RPC is a remote procedure call protocol that uses XML to encode its calls and HTTP as a transport mechanism. XML-RPC is a simple protocol defining only a handful of data types and commands. In addition, HEI communications component 560 allows other communication formats to flow back and forth, including, e.g., email, HTTP, binary packets, etc. The HEI communications component 560 may be connected to HEI buffers 562, the purpose of which is to store an amount of data transmitted from the server 110 to the WDM network 170, which data can be retrieved so it is not lost during network protection switching as described with respect to FIGS. 11 and 12.

Figure 7:
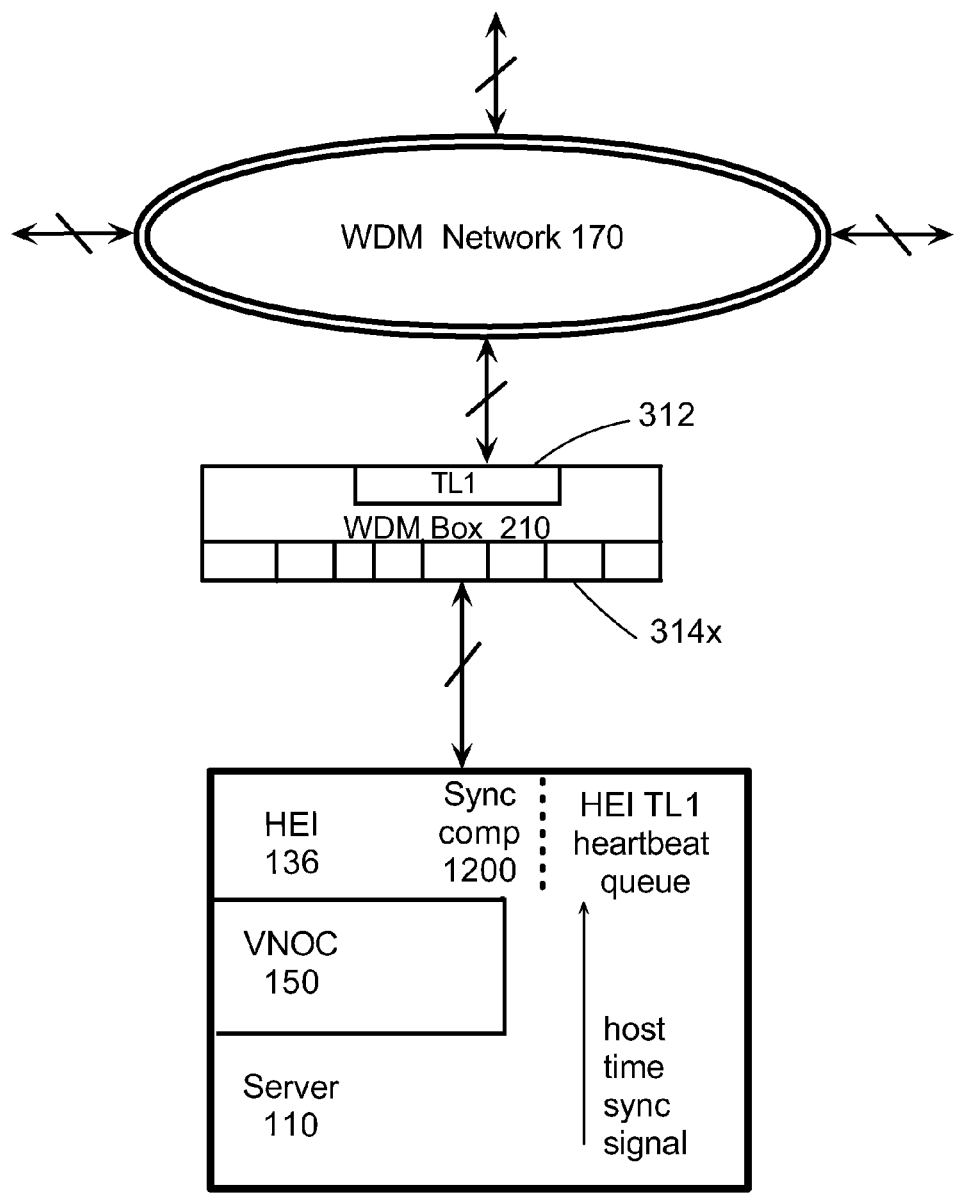
FIG. 7 is a simplified block diagram of components within the computer system to implement event and time synchronization on the WDM network.

FIG. 7 illustrates additional components comprising the HEI that coordinate and synchronize events occurring on the WDM network 170 with processing data in the server 110. The HEI 136 has been implemented with a TL1 heartbeat queue 720, preferably a FIFO that stores a series of heartbeat signals received in TL1 messages arriving from the WDM network 170 at the TL1 interface 314x for at least the previous 50 milliseconds. The HEI 136 also contains a synchronization component 1200 that receives a time sync signal from the server and is able to synchronize the server's data with the TL1 heartbeat signal 734, as will be described further in FIG. 12.

Figure 8:
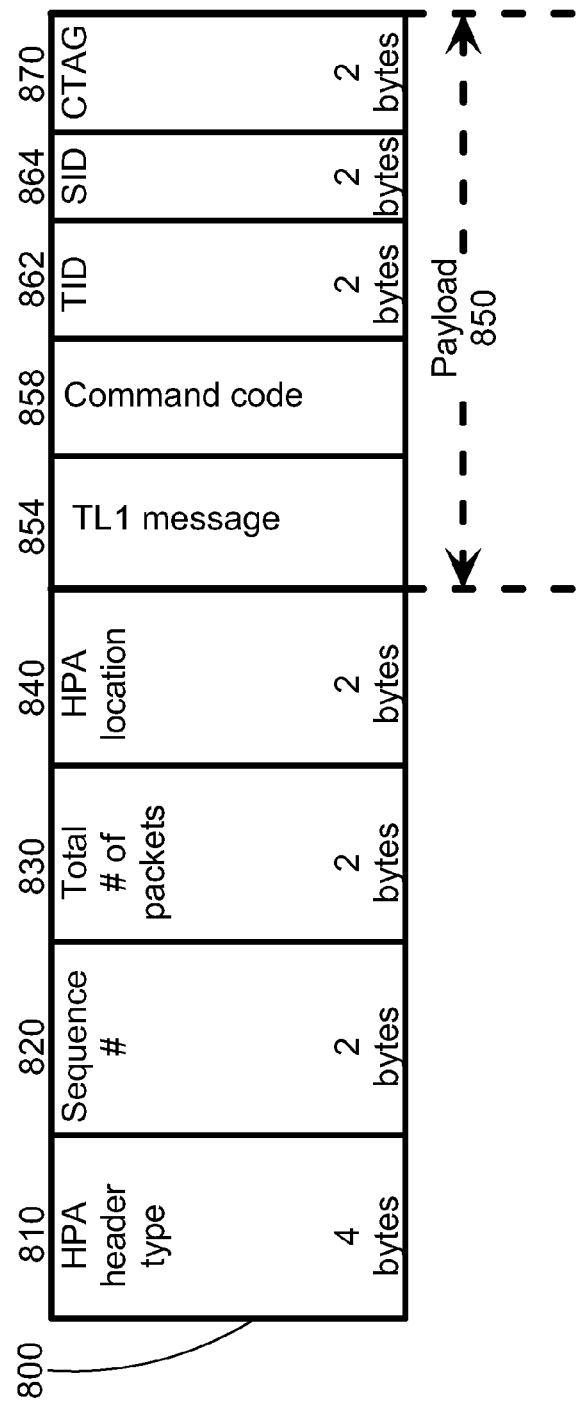
FIG. 8 is flow chart of the process steps implemented by the components shown by which the WDM network can be provisioned and commissioned in accordance with embodiments described herein.
Figure 9:
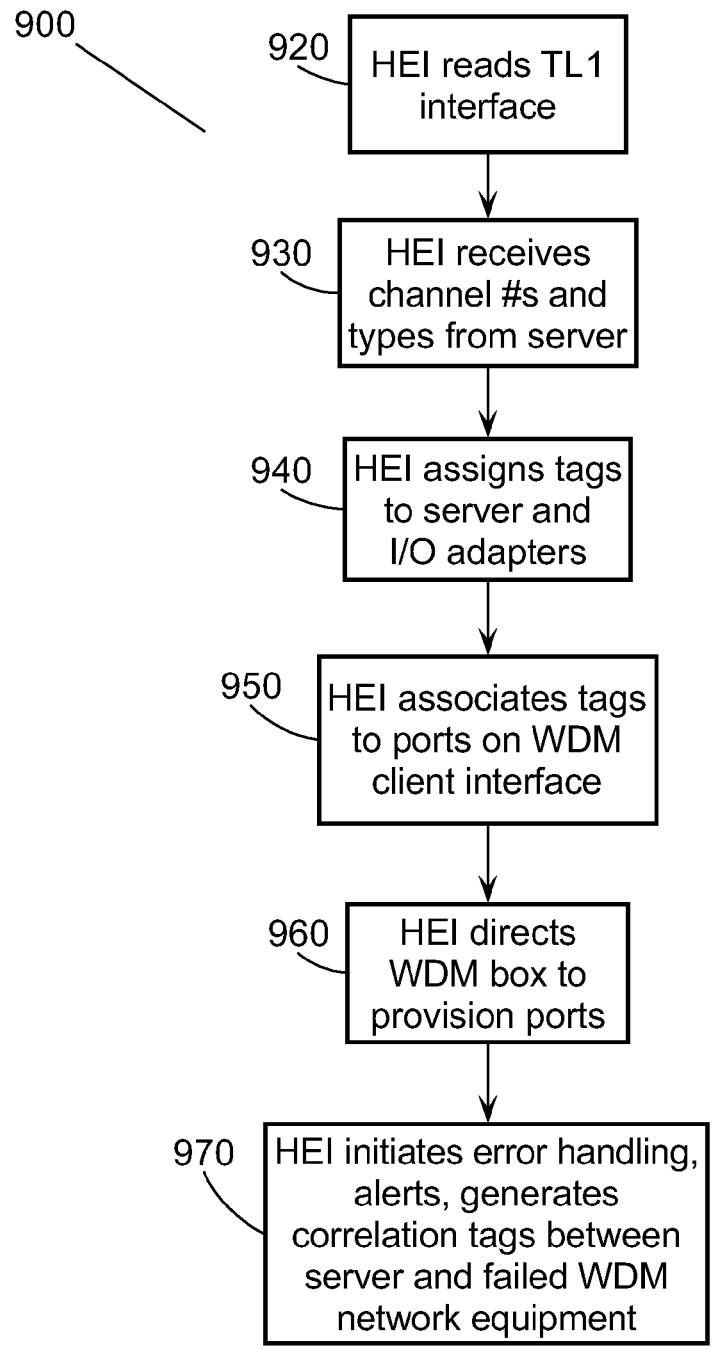
FIG. 9 is a simplified flow chart of the process steps and components used for configuring the WDM network in accordance with an embodiment described herein.

As briefly mentioned earlier, the simulated connection component 640 of the HEI 136 encapsulates TL1 messages into a Holographic Protocol Architecture (HPA) format understandable to the VNOC 150. The TL1 input message is a message from equipment on the WDM network 170, such as a client 140 or a router 322 or other equipment to the VNOC 150. For instance, an alert that indicates a WDM equipment has experienced a failure on one of its links will send a TL1 message using the TL1 command code set defined by the WDM equipment provider. The HEI 136 will encapsulate the TL1 message and forward it to the VNOC 150 so that the failure can be represented in the virtual world. The HPA packet 800 is shown in FIG. 8. The HPA packet type header 810 of four bytes and the sequence number 820 of two bytes of this particular HPA packet, a field 830 of two bytes for the total number of packets in the HPA message, a two-byte field 840 for the HPA location ID of the processor generating the HPA message. The payload 850 containing the TL1 message is formatted as follows: TL1 input message 854, command codes 858 of variable length describing the nature of the event being reported or the command which is being requested, the transmit identifier (TID) 862 of two bytes which identifies that piece of WDM equipment that generated the TL1 command; a source identifier (SID) 866 of two bytes which identifies which subsystem within the WDM equipment that generated the TL1 command is affected by the command, e.g., which card in a network chassis; and a CTAG 870 or correlation tag having eight bytes that correlates messages to various related events. Thus, the HEI 136 connects server 110 to other systems connected on the WDM network 170 and transforms their native systems management interfaces into the HPA, and manages communications with the virtual world. Of course, one of skill in the art understands that the number of bytes assigned to a particular field and, indeed, the fields themselves are chosen for a particular embodiment and as the embodiments change, so also will the number of bytes, the fields in the messages. Even the choice of a TL1 command is based on the equipment in the WDM network 170 and as the equipment changes its command format, so all will the messages that will be encapsulated by the HEI 136 for transmission to the VNOC 150.

Process steps of a component 900 to provision and commission a WDM network 170 are shown in FIG. 7. In step 920, the HEI 136 reads the TL1 interface to receive TL1 messages. From these TL1 messages, the HEI 136 reads information about the WDM network, its equipment, such as adapter cards, power modules, the WDM channel extensions 220, 420 etc. and topology. The HEI 136 also obtains information about the client side channel types and networking configuration, the source ids (SIDs) and transmit ids (TIDs), for instance, the channels/ports 420x and 430x in FIG. 4 and, for example, point-to-point or multipoint ring, with or without protection switching. This information can be extracted from a management information base (MIB), a computing information repository, that may, for example, use simple network management protocol (SNMP) with put/place commands enabled. In step 940, the HEI 136 assigns source and target identifiers (SID/TID) to each piece of equipment on the WDM network 170. Different types of correlation tags relate one message type to another.

Likewise, in step 940, the HEI 136 reads data from the server 110 about its output I/O interface types and desired configuration, such as, for example, three FICON channels from host chip id 01A, 02B, ten Ethernet channels, and 0FF. Server I/O types can be obtained from a management information base but configuration information may be obtained from the server hardware management console or input manually within the VNOC 150. In step 940, the HEI 136 assigns artificial TL1 Ids (AIDs) to the server 110 and the server's I/O adapters. The HEI 136 assigns an ID to each server 110 on the WDM network 170. There may be at least two redundant servers on opposite ends of a disaster recovery network. In step 950, the HEI 136 associates the channel types and data rates of the server's I/O adapters to ports, client protocols, data rates, and interface types on the WDM equipment. In step 960, the HEI 136 may send TL1 commands to the WDM networking box 220 to provision its interfaces to receive the server's data protocols and rates on particular ports, i.e., to change the data rate or protocol or make the channel a protected or unprotected channel and the type of regeneration signal. In step 970, the HEI 136 initiates appropriate error handling and alerts, and generates correlation tags between the I/O adapters and protocols of the server 110 and elements connected to the WDM networking equipment.

One of skill in the art will appreciate that the WDM network equipment can be provisioned and commissioned from either end of the WDM network 170. If, moreover, the WDM network equipment provides an inband or outband TL1 management channel (see 422 and 432 in FIG. 4 and if one of the channel/ports 420x, 430x is a TL1 interface), then both ends of the WDM network 170 can be provisioned from a single endpoint having the modified HEI 136. Today, this operation is performed manually by skilled field technicians, a process which is costly, time consuming, and prone to errors.

Figure 10:
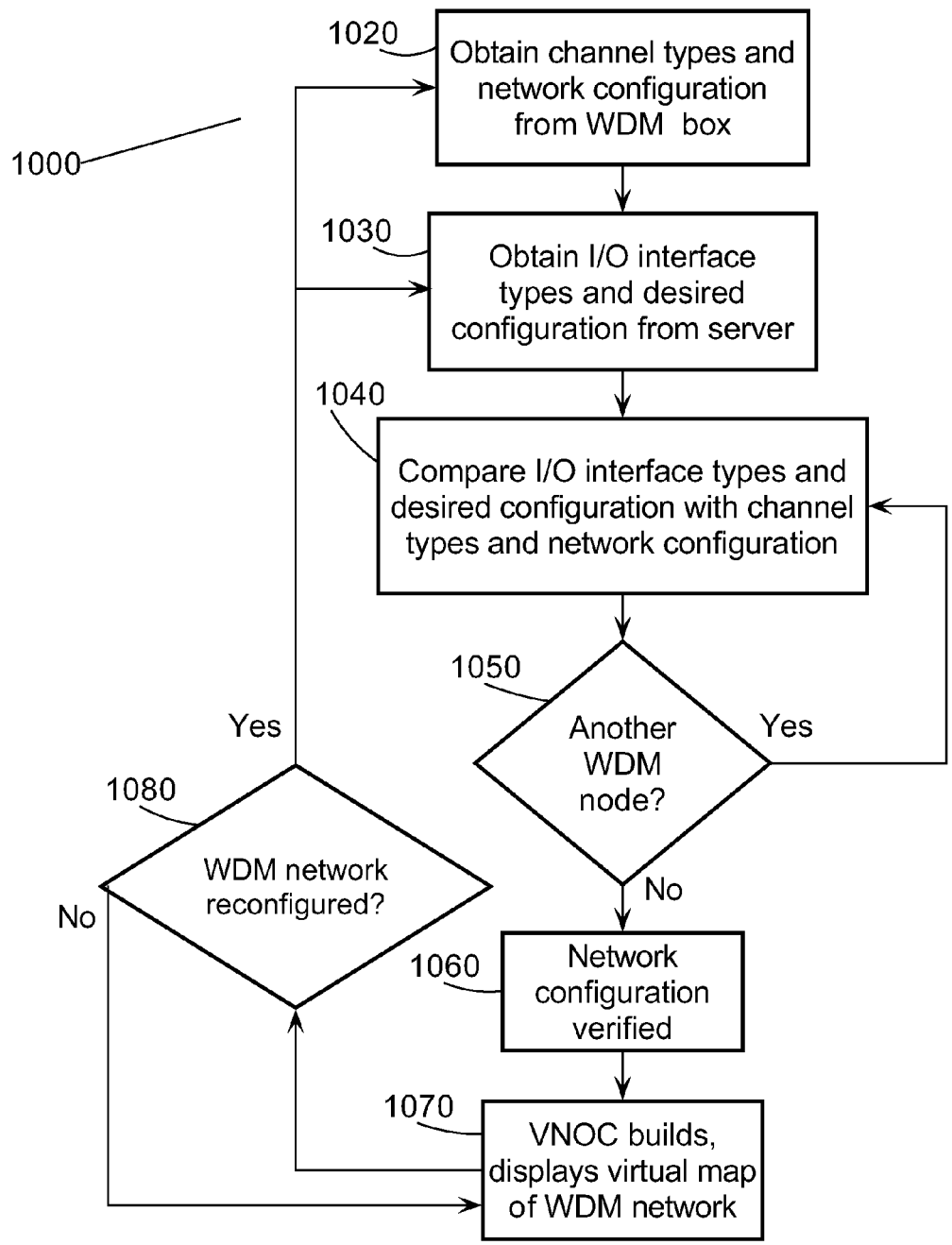
FIG. 10 is a simplified flow chart of the process steps and components used for verification and reconfiguration of the WDM network in accordance with an embodiment described herein.

The component 1000 that validates the configuration of a WDM network 170 using a VNOC 150 may execute the process steps shown in FIG. 10. In step 1020, the HEI 136 obtains information from the WDM networking equipment 220, 230 about its channel types and networking configuration including topology which can be obtained from its MIB using SNMP protocol. In step 1030, the HEI obtains I/O interface information and a desired configuration from the server 110. In step 1040, the HEI 136 compares the channel types, data rates, regeneration type, and protection requirements of the server 110 with the client protocol and interfaces on the WDM networking box 220, 230. If there is another node on the WDM network, as in step 1050, the HEI 136 obtains this information for each node. Once all the nodes on the WDM network 170 have been accounted for as in step 1040, the network configuration is thus verified as in step 1060. This WDM network configuration, including topology of primary and secondary traffic paths, is then encapsulated in HPA commands and transmitted to the VNOC 150 for display of this WDM network, as in step 1070. In this way, any subsequent status change on individual ports, as in for example, a failure in the WDM equipment or an unplugged cable on a server is visible to the HEI 136 and to the server 110 although such events are usually not visible to the server 110 or the network equipment 220 or both. In step 1080, this process can repeat itself periodically on a polled basis or whenever this is a change that affects the WDM network 170, or a qualified reconfiguration of the WDM network 170.

Figure 11:
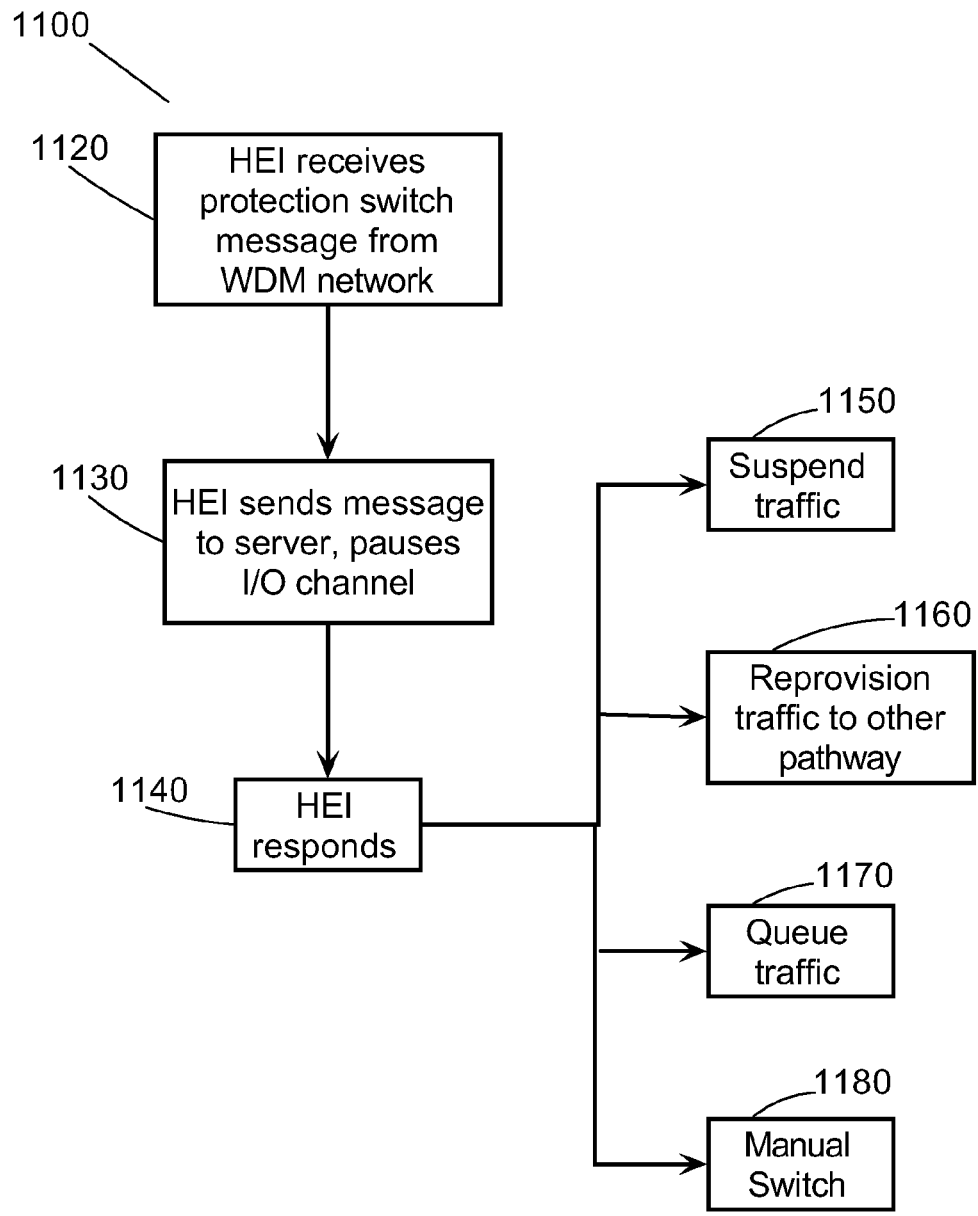
FIG. 11 is a simplified flow chart of the process steps and components used to provide protection switching in the WDM network in accordance with embodiments described herein.

FIG. 11 presents the process steps undertaken by the protection switching component 1100 to provide transparent protection switching on the WDM network through a VNOC 150. In step 1120, the HEI 136 receives a TL1 protection switch message from the WDM networking box 220 indicating a condition on the WDM network that may require rerouting or switching communications. In step 1130, the HEI 136 decodes the source ID, reads the protection associated with the SID, correlates the SID to the AID of the server 110. The HEI 136 then encapsulates the TL1 protection switch message into HPA protocol as described above and sends the HPA message to the server 110 via the VNOC 150 to pause the I/O channel(s). In step 1140, the HEI 136 may further respond by suspending network communication on that channel(s) as in step 1150, reprovisioning traffic to a redundant or other pathway as in step 1160, queuing outgoing traffic to the WDM network for a suitable period of time to allow switching, e.g., 50 milliseconds, in HEI buffers as in step 1170. A user may also manually switch the traffic in step 1180 using the VNOC 150.

Figure 12:
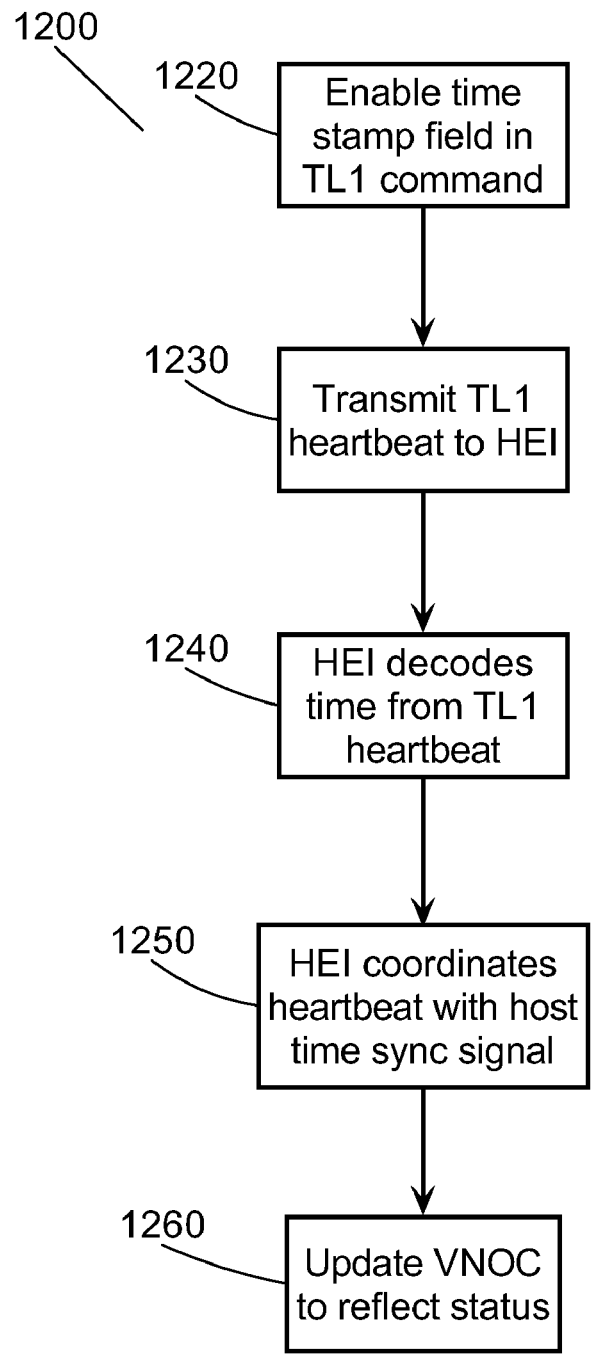
FIG. 12 is a simplified flow chart of the process steps and components whereby events occurring on the WDM network can be synchronized with events occurring on the server in accordance with embodiments described herein.

FIG. 12 provides a simplified flow chart of the method steps executed by the synchronization component 1200 to process synchronous events between servers and associated network equipment using the VNOC 150. To implement synchronous event processing, a hardware interface is incorporated into the HEI 136 such as was shown in FIG. 7. The timing interface permits a time synchronization signal 734 from the server 110, such as from the System Z STI or Sysplex Timer interface, to be used as the reference by which to synchronize activities between the various network and server elements. In step 1220, an optional time stamp field is enabled in TL1 commands at the WDM networking equipment. Because of the enablement, a periodic heartbeat function transmits WDM network status to the TL1 interface of the HEI 136 on a regular basis as in step 1230. The HEI 136 decodes this time stamp in step 1240 and coordinates the time of day with a timestamp from the server 110, such as a Sysplex Timer timestamp in step 1250. In step 1260, the HEI 136 updates the VNOC 150 to reflect the proper network and server coordinated status. This signal would be used in software or firmware by the HEI 136 to insure synchronous processing of events on the WDM network and server I/O interfaces thereby preserving data integrity in the event of a network failure by, e.g., determining which data remains valid when a failure occurs and discarding any invalid data. This function is especially useful in synchronous disaster recovery such as, for example real time transaction mirroring used in financial sector applications.

It should be appreciated that the teachings of the present invention could be offered as a business method on a subscription or fee basis. For example, a computer system 100 comprising VNOC 150 and HEI 136 may be created, maintained and/or deployed by a service provider that offers the functions described herein for customers. That is, a service provider could offer to provide data processing as described above. This includes, e.g., rendering a three-dimensional representation of the WDM network and a server having a data center, the WDM network's middleware and processes.

Advantages of such a three-dimensional model include immersive interaction with familiar spatial and visual characteristics, the ability for multiple personnel to interact together in the virtual environment despite geographic distances, and many other significant advantages.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one ore more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to provision and commission a data communications network having at least one optical channel, the method comprising the steps of:

operationally connecting a holographic enterprise interface between the data communications network and a three-dimensional virtual network operations center installed on at least one server;

the holographic enterprise interface extracting network information about the network configuration and identifiers of equipment on the network;

the holographic enterprise interface receiving information about the at least one server's and other servers' connected on the data communications network I/O configurations;

the holographic enterprise interface assigning server identifiers to one or more I/O adapters of the at least one server's and other servers' connected on the data communications network I/O configurations;

the holographic enterprise interface modifying one or more of the I/O adapters of the at least one server's and other servers' connected on the data communications network I/O configurations to read and write messages on the data communications network;

the holographic enterprise interface associating the at least one server's and other servers' connected on the data communications network identifiers with the network configuration and the one or more identifiers of the equipment on the network;

the holographic enterprise interface provisioning the data communications network so that equipment on the network will receive and transmit data in a protocol and data rate compatible with the one or more I/O adapters of the at least one server and other servers connected on the data communications network;

the holographic enterprise interface encapsulating at least a portion of received data from the data communications network in a holographic protocol;

the holographic enterprise interface transmitting received data to the three-dimensional virtual network operations center; and at least one server rendering the network configuration in the three-dimensional virtual network operations center.

2. The method to provision a data communications network of claim 1 further comprising:
the holographic enterprise interface generating correlation tags between the equipment on the data communications network provisioned to receive data from the I/O adapters of the at least one server and other servers connected on the data communications network.

3. The method to provision a data communications network of claim 1 further comprising:
the data communications network having a plurality of optical channels.

4. The method to provision a data communications network of claim 3 further comprising:
one or more of the plurality of optical channels being connected to a wavelength division multiplexed network.

5. The method to provision a data communications network of claim 1 further comprising:
the holographic enterprise interface extracting network information comprising data protocols and data rates of data transmitted on the data communications network.

6. The method to provision a data communications network of claim 1 further comprising:
the holographic enterprise interface extracting network information comprising the topology of the data communications and connection information of the equipment on the network.

7. The method to provision a data communications network of claim 1 further comprising:
the holographic enterprise interface extracting network information comprising protection switching capabilities of the data communications network.

8. The method to provision a data communications network of claim 1 further comprising:
the holographic enterprise interface extracting network information comprising one or more regeneration commands for the equipment on the data communications network.

9. The method to provision a data communications network of claim 1 further comprising:
the holographic enterprise interface receiving network configuration information in TL1 messages.

10. A computer program product for provisioning and commissioning a data communications network operatively coupled to a server, the computer program product comprising:
a tangible computer readable storage medium having computer readable program code embodied therewith, the computer readable program code comprising:
a network extraction component of a holographic enterprise interface to extract network configuration information of a data communications network;
a server extraction component of the holographic enterprise interface to extract information of a server's I/O configuration, the server being operationally coupled to the data communications network;
an identifier component of the holographic enterprise interface that assigns identifiers to one or more I/O adapters of the server's I/O configuration and extracts identifiers of each equipment of the data communications network;
a tag association component of the holographic enterprise interface that stores the identifiers of the one or more I/O adapters of the server and the one or more identifiers of the equipment on the data communications network;
a tag correlation component of the holographic enterprise interface to correlate the identifiers of the one or more I/O adapters of the server with the one or more identifiers of the equipment on the data communications network that receives and transmits data from and to to its respective one or more I/O adapters;
a commissioning component of the holographic enterprise interface to control data communications on the data communications network so that equipment on the data communications network will receive and transmit data in a protocol and data rate and on a channel compatible with other equipment on the data communications network; and
a communications component of the holographic enterprise interface to encapsulate at least a portion of the data communications in a holographic protocol;
the communications component of the holographic enterprise to transmit the data communications comprising at least a configuration of the data communications network to a three-dimensional virtual network operations center operationally coupled to the server.

11. The computer program product of claim 10 further comprising:
a tangible computer readable storage medium having computer readable program code embodied therewith, the computer readable program code comprising:
a plug-in framework component of the holographic enterprise interface comprising one or more plug-ins for the one or more I/O adapters of the server's I/O configuration to translate the I/O adapter's protocol to a protocol for transmission on the data communications network.

12. The computer program product of claim 10 further comprising:
a tangible computer readable storage medium having computer readable program code embodied therewith, the computer readable program code comprising:
a TL1 component of the holographic enterprise interface to read and write TL1 commands from and to the data communications network.

13. The computer program product of claim 10 further comprising:
a tangible computer readable storage medium having computer readable program code embodied therewith, the computer readable program code comprising:
a network event component of the holographic enterprise interface to provide protection switching and regeneration commands when an event occurs on the data communications network.

14. The method to provision a data communications network of claim 9 further comprising:
the holographic enterprise interface encapsulating the TL1 messages in a holographic protocol format.

* * * * *